(12) United States Patent
Zhou et al.

(10) Patent No.: US 11,942,775 B2
(45) Date of Patent: Mar. 26, 2024

(54) HIGH VOLTAGE BATTERY CLUSTER, AND OVERCURRENT PROTECTION CIRCUIT AND SWITCH BOX THEREOF

(71) Applicant: SUNGROW POWER SUPPLY CO., LTD., Anhui (CN)

(72) Inventors: Jianjie Zhou, Hefei (CN); Renxian Cao, Hefei (CN); Yilei Gu, Hefei (CN); Shanming Yang, Hefei (CN); Hui Tong, Hefei (CN); Xiaohu Xu, Hefei (CN); Jinsheng Li, Hefei (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 740 days.

(21) Appl. No.: 17/040,501

(22) PCT Filed: Dec. 26, 2019

(86) PCT No.: PCT/CN2019/128525
§ 371 (c)(1),
(2) Date: Sep. 22, 2020

(87) PCT Pub. No.: WO2021/004027
PCT Pub. Date: Jan. 14, 2021

(65) Prior Publication Data
US 2023/0107559 A1  Apr. 6, 2023

(30) Foreign Application Priority Data
Jul. 8, 2019 (CN) .......................... 201910609878.8

(51) Int. Cl.
*H02H 3/087* (2006.01)
*B60L 3/00* (2019.01)
*H02J 7/00* (2006.01)

(52) U.S. Cl.
CPC .......... *H02H 3/087* (2013.01); *B60L 3/0069* (2013.01); *H02J 7/00304* (2020.01); *H02J 7/0031* (2013.01)

(58) Field of Classification Search
CPC ........ H02H 3/087; H02H 7/18; B60L 3/0069; H02J 7/00304; H02J 7/0031; H02J 7/0026; H02J 2207/20; Y02E 60/10
See application file for complete search history.

(56) References Cited

U.S. PATENT DOCUMENTS 10,583,749 B2 * 3/2020 Schmidt .............. H02J 7/00308
11,205,951 B2 * 12/2021 Jang ...................... H02J 7/0031
(Continued)

FOREIGN PATENT DOCUMENTS

CN 102097796 A 6/2011
CN 102570389 A 7/2012
(Continued)

OTHER PUBLICATIONS

International Search Report and Written Opinion (in Chinese) issued in PCT/CN2019/128525, dated Apr. 13, 2020; ISA/CN.
(Continued)

*Primary Examiner* — Jared Fureman
*Assistant Examiner* — Nicolas Bellido
(74) *Attorney, Agent, or Firm* — Harness, Dickey & Pierce, P.L.C.

(57) ABSTRACT

A high voltage battery cluster, and an overcurrent protection circuit and a switch box of the high voltage battery cluster are provided. The overcurrent protection circuit includes a first fusing module and a second fusing module. Since a withstand current-time curve of the first fusing module is different from a withstand current-time curve of the second fusing module, in a case that an overcurrent fault occurs in a high voltage battery cluster, one fusing module can cause
(Continued)

an open circuit in the high voltage battery cluster prior to another fusing module, thereby preventing the high voltage battery cluster from being broken by a large current when an overcurrent fault occurs in the high voltage battery cluster, thus ensuring an electrical safety of the high voltage battery cluster.

17 Claims, 12 Drawing Sheets

(56) References Cited

U.S. PATENT DOCUMENTS

| | | | |
|---|---|---|---|
| 2003/0107851 A1 | 6/2003 | Grimm et al. | |
| 2014/0093752 A1 | 4/2014 | Shen et al. | |
| 2017/0126032 A1 | 5/2017 | Beaston | |
| 2018/0272883 A1 | 9/2018 | Schmidt et al. | |
| 2018/0320831 A1 | 11/2018 | Li et al. | |
| 2019/0363562 A1* | 11/2019 | Dan | H01M 10/425 |
| 2021/0152079 A1* | 5/2021 | Jang | H02H 7/122 |

FOREIGN PATENT DOCUMENTS

| | | | |
|---|---|---|---|
| CN | 202839883 U | 3/2013 | |
| CN | 204367903 U | 6/2015 | |
| CN | 104836191 A | 8/2015 | |
| CN | 206442130 U | 8/2017 | |
| CN | 107591829 A | 1/2018 | |
| CN | 110299744 A | 10/2019 | |
| JP | 2005285717 A | 10/2005 | |
| JP | 2014235997 A | 12/2014 | |
| JP | 2016144340 A | 8/2016 | |
| WO | WO-2014196200 A1 * | 12/2014 | ......... H01H 85/0445 |
| WO | WO-2018216850 A1 | 11/2018 | |
| WO | WO-2022183772 A1 * | 9/2022 | ............... H02H 7/18 |

OTHER PUBLICATIONS

First Office Action (in English and Chinese) issued in CN-201910609878.8, dated Jun. 2, 2020.

First Japanese Office Action regarding Application No. 2020-551316 dated Nov. 15, 2021. English translation provided by Unitalen Attorneys at Law.

Second Australian Office Action regarding Application No. 2019435043 dated Jul. 23, 2021.

* cited by examiner

HIGH VOLTAGE BATTERY CLUSTER, AND OVERCURRENT PROTECTION CIRCUIT AND SWITCH BOX THEREOF

CROSS-REFERENCE TO RELATED APPLICATIONS

The present application is a national phase of International Patent Application No. PCT/CN2019/128525, titled "HIGH VOLTAGE BATTERY CLUSTER, AND OVERCURRENT PROTECTION CIRCUIT AND SWITCH BOX THEREOF", filed on Dec. 26, 2019, which claims priority to Chinese Patent Application No. 201910609878.8, titled "HIGH VOLTAGE BATTERY CLUSTER, AND OVERCURRENT PROTECTION CIRCUIT AND SWITCH BOX THEREOF" filed on Jul. 8, 2019 with the Chinese Patent Office, both of which are incorporated herein by reference in their entireties.

FIELD

The present disclosure relates to the field of power electronic technology, and in particular to a high voltage battery cluster, and an overcurrent protection circuit and a switch box of the high voltage battery cluster.

BACKGROUND

At present, the electrochemical energy storage is widely developed in electric power systems. A capacity of the electrochemical energy storage in a typical application reaches MWh level for a single container, a port voltage of a single battery pack reaches 1000V, and even 1500V, and a charging/discharging current of the single battery pack reaches several hundred amperes. Therefore, in an operating environment under a high-voltage and large-current, a serious circuit safety problem may be caused in a case that an overcurrent fault, such as a short-circuit fault or an overload fault, occurs in a circuit.

In order to avoid the serious circuit safety problem caused due to the overcurrent fault occurring in the circuit, in the conventional technology, each of a positive branch and a negative branch of a high voltage battery cluster is generally arranged with a fuse, to ensure that the high voltage battery cluster is disconnected from the circuit when the overcurrent fault occurs in the circuit.

However, with above method, two fuses are both fused when the overcurrent fault occurs in the circuit, and a drawn arc thus generated may cause a large current change rate. In addition, a large voltage change rate is caused under an action of a parasitic inductance of the circuit, which may cause a large reverse voltage across two ends of the high voltage battery cluster. A peak value of the reverse voltage may be 2 to 5 times of a rated voltage of the high voltage battery cluster, directly affecting electrical safety of the high voltage battery cluster severely.

SUMMARY

In view of this, a high voltage battery cluster, and an overcurrent protection circuit and a switch box of the high voltage battery cluster are provided according to the present disclosure, to reduce a current impulse and a voltage impulse in the conventional technology, which are caused in a circuit due to that two fuses are both fused.

To achieve above object, the following technical solutions are provided according to embodiments of the present disclosure.

According to a first aspect of the present disclosure, an overcurrent protection circuit of a high voltage battery cluster is provided. The overcurrent protection circuit includes a first fusing module and a second fusing module. The first fusing module is arranged in a positive branch of a switch box of the high voltage battery cluster. The second fusing module is arranged in a negative branch of the switch box of the high voltage battery cluster. A withstand current-time curve of the first fusing module is different from a withstand current-time curve of the second fusing module.

In an embodiment, the first fusing module is arranged between a direct current switch in the positive branch and an output terminal of the positive branch, and the second fusing module is arranged between a direct current switch in the negative branch and an input terminal of the negative branch. Alternatively, the first fusing module is arranged between the direct current switch in the positive branch and an input terminal of the positive branch, and the second fusing module is arranged between the direct current switch in the negative branch and an output terminal of the negative branch.

In an embodiment, the first fusing module is arranged between a direct current switch in the positive branch and an output terminal of the positive branch, and the second fusing module is arranged between a direct current switch in the negative branch and an output terminal of the negative branch. Alternatively, the first fusing module is arranged between the direct current switch in the positive branch and an input terminal of the positive branch, and the second fusing module is arranged between the direct current switch in the negative branch and an input terminal of the negative branch.

In an embodiment, one of the first fusing module and the second fusing module is a fuse operating high-sensitively.

In an embodiment, another of the first fusing module and the second fusing module is a fuse with both an overload breaking capacity and a short-circuit breaking capacity.

In an embodiment, under the same withstanding current, fusing duration of the first fusing module and fusing duration of the second fusing module are less than fusing duration of a direct current switch in the switch box of the high voltage battery cluster.

In an embodiment, the withstand current-time curve of the first fusing module has an intersection with the withstand current-time curve of the second fusing module.

In an embodiment, the overcurrent protection circuit further includes an RCD snubber circuit. An input terminal of the RCD snubber circuit is connected to a positive input terminal of the switch box, and an output terminal of the RCD snubber circuit is connected to a negative input terminal or a positive output terminal of the switch box.

In an embodiment, the RCD snubber circuit includes a resistor, a capacitor and a diode. A terminal of the resistor is connected to a positive electrode of the diode, and a connection point between the terminal of the resistor and the positive electrode of the diode serves as an input terminal of the RCD snubber circuit, another terminal of the resistor and a negative electrode of the diode are connected to a terminal of the capacitor, and another terminal of the capacitor serves as an output terminal of the RCD snubber circuit.

According to a second aspect of the present disclosure, a switch box of a high voltage battery cluster is further provided. The switch box includes a positive branch, a negative branch and any one of the overcurrent protection circuit of a high voltage battery clusters described above. Each of the positive branch and the negative branch is arranged with a direct current switch. An input terminal of the positive branch serves as a positive input terminal of the switch box, and an output terminal of the positive branch serves as a positive output terminal of the switch box. An input terminal of the negative branch serves as a negative input terminal of the switch box, and an output terminal of the negative branch serves as a negative output terminal of the switch box.

According to a third aspect of the present disclosure, a high voltage battery cluster is further provided. The high voltage battery cluster includes N battery modules and the switch box described above. The N battery modules are sequentially connected in series to form a series branch, where a positive electrode of the series branch is connected to the positive input terminal of the switch box, and a negative electrode of the series branch is connected to the negative input terminal of the switch box. The positive output terminal of the switch box serves as a positive electrode of the high voltage battery cluster, and the negative output terminal of the switch box serves as a negative electrode of the high voltage battery cluster.

The overcurrent protection circuit of a high voltage battery cluster according to the present disclosure includes a first fusing module and a second fusing module. Since a withstand current-time curve of the first fusing module is different from a withstand current-time curve of the second fusing module, in a case that an overcurrent fault occurs in a high voltage battery cluster, one fusing module can cause an open circuit in the high voltage battery cluster prior to another fusing module, thereby preventing the high voltage battery cluster from being broken by a large current when the overcurrent fault occurs in the high voltage battery cluster, thus ensuring an electrical safety of the high voltage battery cluster. In addition, compared with the conventional technology, according to the present disclosure, when the overcurrent fault occurs in the high voltage battery cluster, only one fuse module is fused to disconnect the high voltage battery cluster from the circuit, such that a superposition of current change rates in the conventional technology caused when two fuses are fused simultaneously can be avoided. In this way, during the whole disconnecting process, the current change rate in the circuit in the present disclosure is lower than that caused when two fuses are fused simultaneously in the conventional technology, thereby reducing a current impulse and a voltage impulse generated in the circuit, thus solving the problem in the conventional technology.

DETAILED DESCRIPTION OF EMBODIMENTS

In order to further understand the present disclosure, preferred technical solutions of the present disclosure are described below in conjunction with embodiments. However, it should be understood that these descriptions are only used for further describing features and advantages of the present disclosure, rather than limiting the claims of the present disclosure.

With the method in the conventional technology, in a case that an overcurrent fault such as a short-circuit fault or an overload fault occurs in a high voltage battery cluster, since two fuses are fused almost simultaneously, a drawn arc generated by the two fuses may results in a superposition of current change rates in a circuit, which may cause a large current change rate in the circuit and further cause a large voltage change rate in the circuit. In this case, a large current impulse and a large voltage impulse may be caused to a positive electrode and a negative electrode of the high voltage battery cluster in the circuit, resulting in a severe effect on electrical safety of the high voltage battery cluster.

Figure 1:
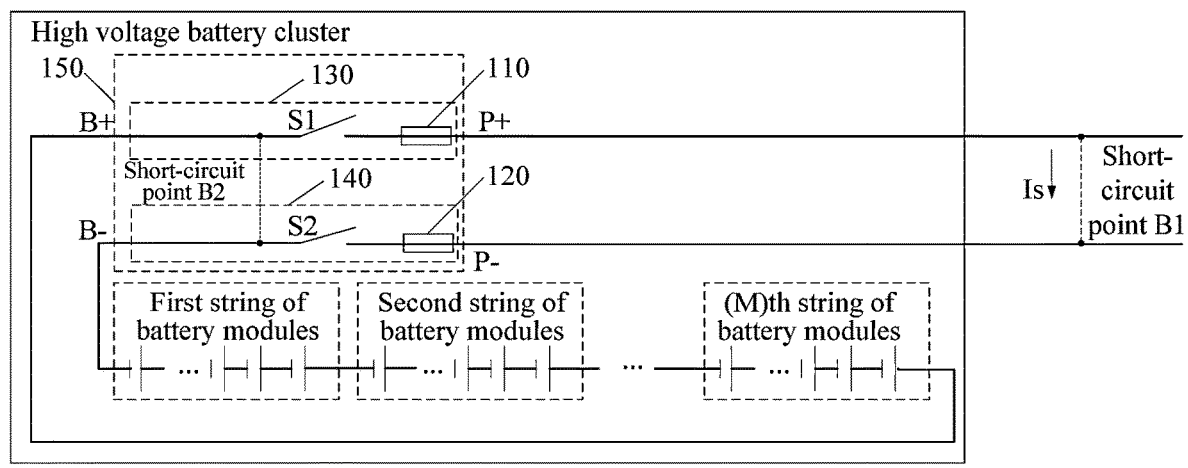
FIG. 1 is a schematic diagram of a high voltage battery cluster according to an embodiment of the present disclosure.

In order to solve the problem in the conventional technology that the large current impulse and the large voltage impulse are generated in the circuit when fuses are fused, an overcurrent protection circuit of a high voltage battery cluster is provided according to an embodiment of the present disclosure. As shown in FIG. 1, the overcurrent protection circuit includes a first fusing module 110 and a second fusing module 120.

The first fusing module 110 is arranged in a positive branch 130 of a switch box 150 of the high voltage battery cluster, and the second fusing module 120 is arranged in a negative branch 140 of the switch box 150 of the high voltage battery cluster.

A withstand current-time curve of the first fusing module 110 is different from a withstand current-time curve of the second fusing module 120. That is, a duration that the first fusing module 110 can withstand a withstand current is different from a duration that the second fusing module 120 can withstand the same withstand current. Therefore, when a overcurrent fault occurs in the high voltage battery cluster, one of the first fusing module 110 and the second fusing module 120 is fused to cause an open circuit in the high voltage battery cluster prior to another of the first fusing module 110 and the second fusing module 120, thereby protecting the high voltage battery cluster from being broken by a large current.

Compared with the conventional technology, according to the present disclosure, when the short-circuit fault occurs in the high voltage battery cluster, only one fuse module is fused to disconnect the high voltage battery cluster from the circuit, such that a superposition of current change rates in the conventional technology caused when two fuses are fused simultaneously can be avoided. In this way, the current change rate in the circuit is lower than that in the conventional technology caused in a case that the two fuses are fused simultaneously during the whole disconnecting process, thereby reducing a current impulse and a voltage impulse generated in the circuit, thus solving the problem in the conventional technology.

Figure 2:
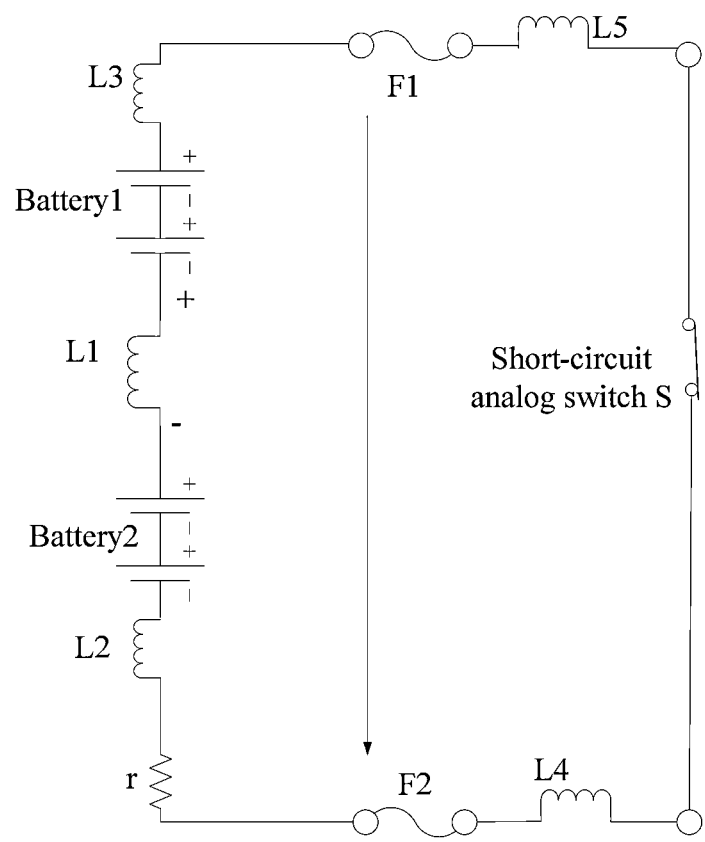
FIG. 2 is a simplified schematic diagram of a circuit of a high voltage battery cluster according to the conventional technology and an embodiment of the present disclosure before two fuses or two fusing modules are fused when a short-circuit fault occurs in the high voltage battery cluster.

In the conventional technology and the present disclosure, in a case that the short-circuit fault occurs in the high voltage battery cluster, a circuit structure of the high voltage battery cluster before two fuses or two fusing modules are fused may be simplified as shown in FIG. 2. In FIG. 2, F1 and F2 represent two fuses in the conventional technology and represent two fusing modules in the present disclosure.

Figure 3:
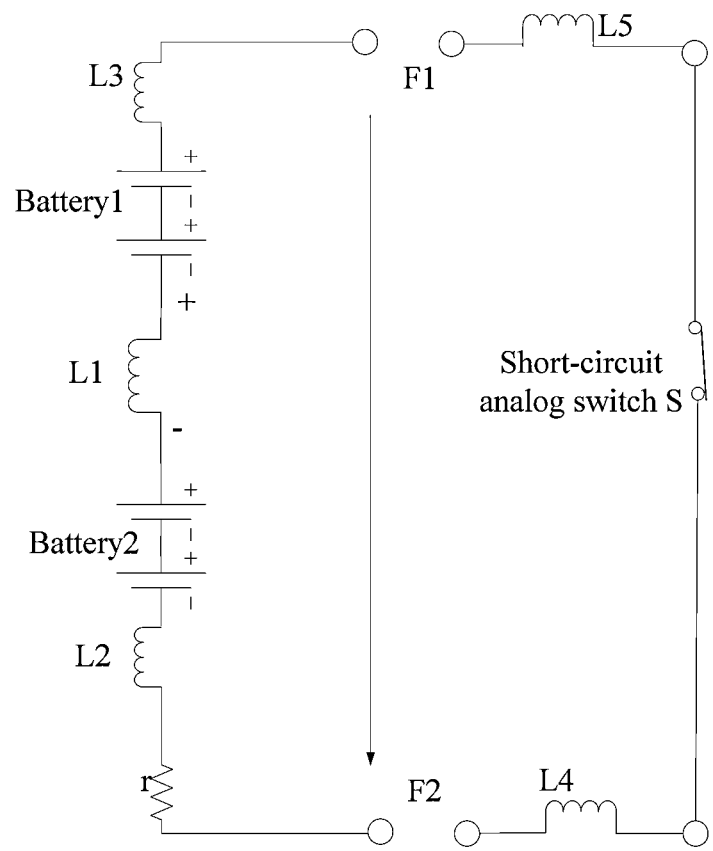
FIG. 3 is a simplified schematic diagram of a circuit of a high voltage battery cluster according to the conventional technology after two fuses are both fused when a short-circuit fault occurs in the high voltage battery cluster.
Figure 4:
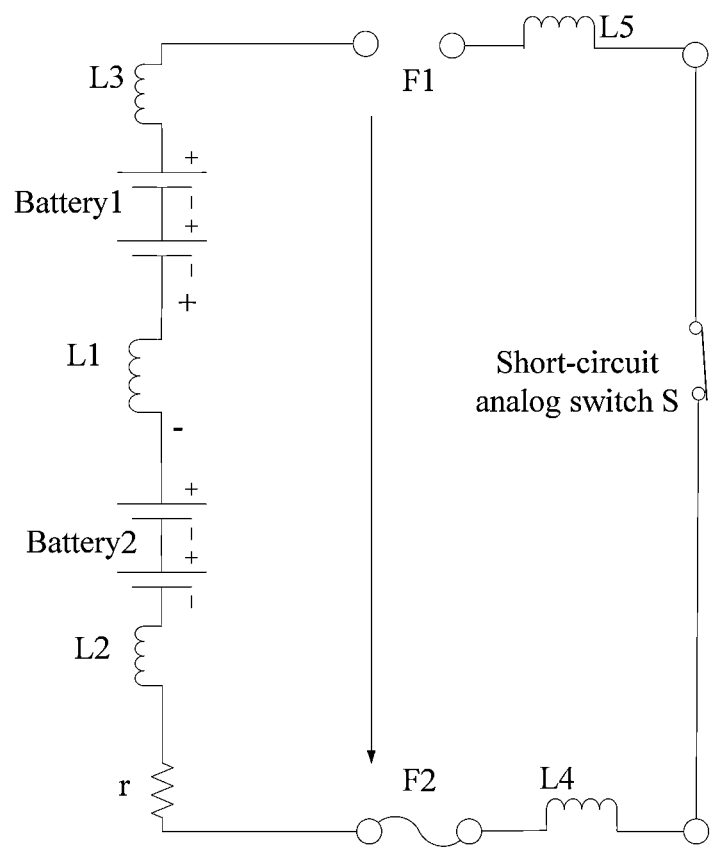
FIG. 4 is a simplified schematic diagram of a circuit of a high voltage battery cluster according to an embodiment of the present disclosure after one of two fuses is fused when a short-circuit fault occurs in the high voltage battery cluster.

In the conventional technology, in a case that the short-circuit fault occurs in the high voltage battery cluster, a circuit structure of the high voltage battery cluster after two fuses are fused may be simplified as shown in FIG. 3, and a circuit inductance formed in this case may be expressed as $L_{conventional}=L1+L2+L3$. In the present embodiment, in a case that the short-circuit fault occurs in the high voltage battery cluster, a circuit structure of the high voltage battery cluster after one of the two fusing modules is fused may be simplified as shown in FIG. 4, and a circuit inductance formed in this case may be expressed as $L_{present}=L1+L2+L3+L4+L5$, which is greater than the circuit inductance $L_{conventional}$ formed in the conventional technology and has a better performance in impeding the change of a current in the circuit. In this way, the current in the circuit changes slowly and a fusing duration is prolonged, such that the current change rate di/dt is reduced, thereby reducing the current impulse and the voltage impulse generated in the circuit.

In above expressions, L1 represents a parasitic inductance of a series line between battery modules in the high voltage battery cluster, L2 represents a parasitic inductance of a connection line between a positive electrode of a battery module branch and a positive input terminal B+ of the switch box 150 in the high voltage battery cluster, L3 represents a parasitic inductance of a connection line between a negative electrode of the battery module branch and a negative input terminal B− of the switch box 150 in the high voltage battery cluster, and L4 and L5 respectively represent parasitic inductances of positive and negative leads by which the high voltage battery cluster is respectively connected to a battery collection panel (BCP) and a power conversion system (PCS).

In a case that an overload fault occurs in the high voltage battery cluster, a process is the same as the above process, which is not described in detail herein.

Figure 5:
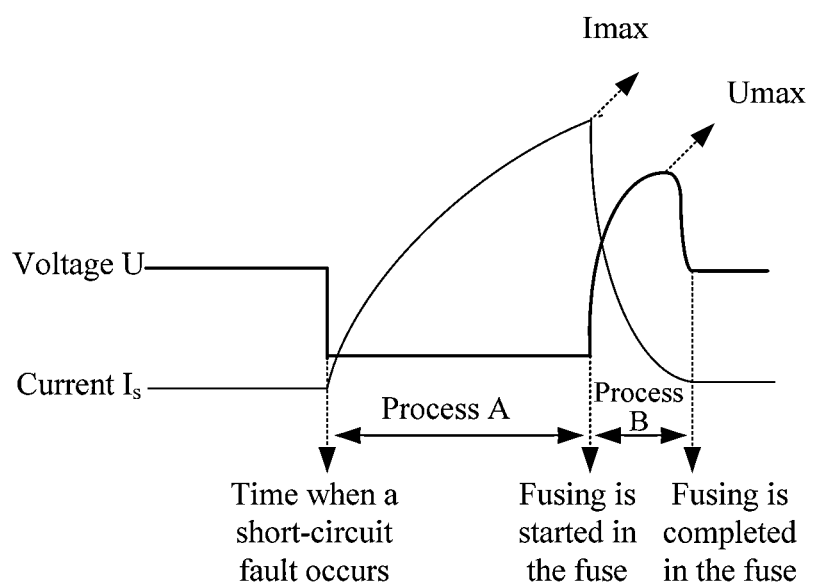
FIG. 5 is a schematic diagram of a reverse voltage and a short-circuit current at two ends of a high voltage battery cluster.
Figure 6:
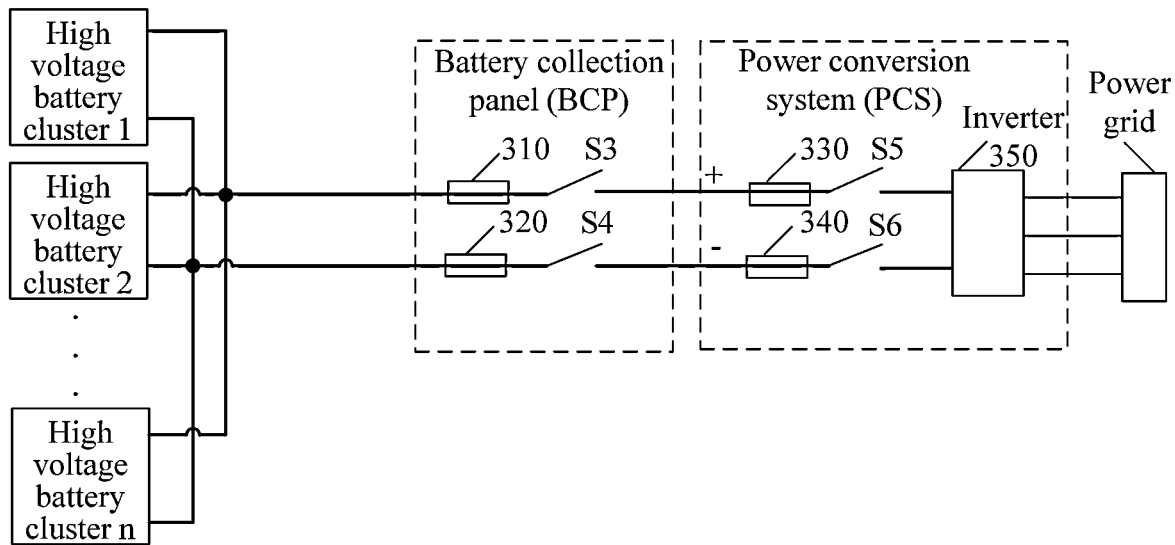
FIG. 6 is a schematic diagram of a connection in a case that a high voltage battery cluster is applied.

Moreover, in the embodiment, in a case that the short-circuit fault occurs in the high voltage battery cluster, in a process from a time when the short-circuit fault occurs in the high voltage battery cluster to a time when one of the two fusing modules is fused, since a resistance r of the circuit is reduced, a terminal voltage of the high voltage battery cluster is reduced, and a short-circuit current $I_s$ is increased rapidly. Changing curves of the short-circuit current $I_s$ and a reverse voltage U during this process are as shown in a process A in FIG. 5. In addition, with the overcurrent protection circuit of a high voltage battery cluster in the embodiment, the current impulse and the voltage impulse generated in the circuit can be reduced. However, during a process from a time when one of the two fusing modules is to fuse to a time when the one of the two fusing modules is fused, since the high voltage battery cluster is connected to the battery collection panel BCP and the power conversion system PCS respectively by long positive and negative leads (as shown in FIG. 6) and the battery modules of the high voltage battery cluster are connected in series by series lines, an inductance L generated in the circuit is large, such that a large current change rate di/dt may be caused by the fusing module during a time period during which a drawn arc is formed, which generally lasts tens of microseconds to hundreds of microseconds. In this case, a large reverse voltage may be generated, which is expressed as U=L*di/dt, where changing curves of the short-circuit current $I_s$ and the reverse voltage U are as shown in a process B in FIG. 5.

The time period during which the drawn arc is formed mainly depends on material characteristics and a fusing mechanism of the selected fuses.

Specifically, the battery collection panel BCP includes a first fuse 310, a second fuse 320, a first direct current switch S3 and a second direct current switch S4. The first fuse 310 is connected in series with the first direct current switch S3 to form a branch, one terminal of the branch serves as a positive input terminal of the battery collection panel BCP, and another terminal of the branch serves as a positive output terminal of the battery collection panel BCP. The second fuse 320 is connected in series with the second direct current switch S4 to form a branch, one terminal of the branch serves as a negative input terminal of the battery collection panel BCP, and another end of the branch serves as a negative output terminal of the battery collection panel BCP.

Specifically, the power conversion system PCS includes a third fuse 330, a fourth fuse 340, a third direct current switch S5, a fourth direct current switch S6 and an inverter 350. The third fuse 330 is connected in series with the third direct current switch S5 to form a branch, one terminal of the branch serves as a positive input terminal of the power conversion system PCS, and another terminal of the branch is connected to a positive input terminal of the inverter 350. The fourth fuse 340 is connected in series with the fourth direct current switch S6 to form a branch, one terminal of the branch serves as a negative input terminal of the power conversion system PCS, and another terminal of the branch is connected to a negative input terminal of the inverter 350. A first output terminal of the inverter 350 serves as a first output terminal of the power conversion system PCS and is connected to a first input terminal of a power grid, a second output terminal of the inverter 350 serves as a second output terminal of the power conversion system PCS and is connected to a second input terminal of the power grid, and a third output terminal of the inverter 350 serves as a third output terminal of the power conversion system PCS and is connected to a third input terminal of the power grid.

In an embodiment, in a case that the short-circuit fault occurs in the high voltage battery cluster, a maximum short-circuit current $I_{max}$ impose a large influence on safety and life of a battery, and even an electrical hazard such as thermal runaway may be caused to the battery in a severe case. Therefore, a fuse operating high-sensitively is used as one of the first fusing module 110 and the second fusing module 120, to control the maximum short-circuit current $I_{max}$ to be in a small range. In addition, in order to control the current change rate di/dt to be in a small range and to reduce a peak value $U_{max}$ of the reverse voltage U, a fuse operating high-sensitively, which has a proper time period during which a drawn arc is formed, is required to be used.

It is to be noted that, when the short-circuit fault occurs in the high voltage battery cluster, the fuse operating high-sensitively is fused to cause an open circuit in the high voltage battery cluster prior to another fusing module.

In an embodiment, in order to ensure electrical safety of a high voltage battery cluster while meeting requirements on current flow capacity and operation sensitivity of the high voltage battery cluster when an overload fault occurs in the high voltage battery cluster, a fuse with both an overload breaking capacity and a short-circuit breaking capacity is used as another one of the first fusing module 110 and the second fusing module 120.

It is to be noted that, when the overload fault occurs in the high voltage battery cluster, the fuse with an overload breaking capacity and a short-circuit breaking capacity is fused to cause an open circuit in the high voltage battery cluster prior to another fuse.

In an embodiment, the fuse operating high-sensitively may be an AR fast fusing fuse, and the fuse with an overload breaking capacity and a short-circuit breaking capacity may be a gPV slow fusing fuse.

Figure 7:
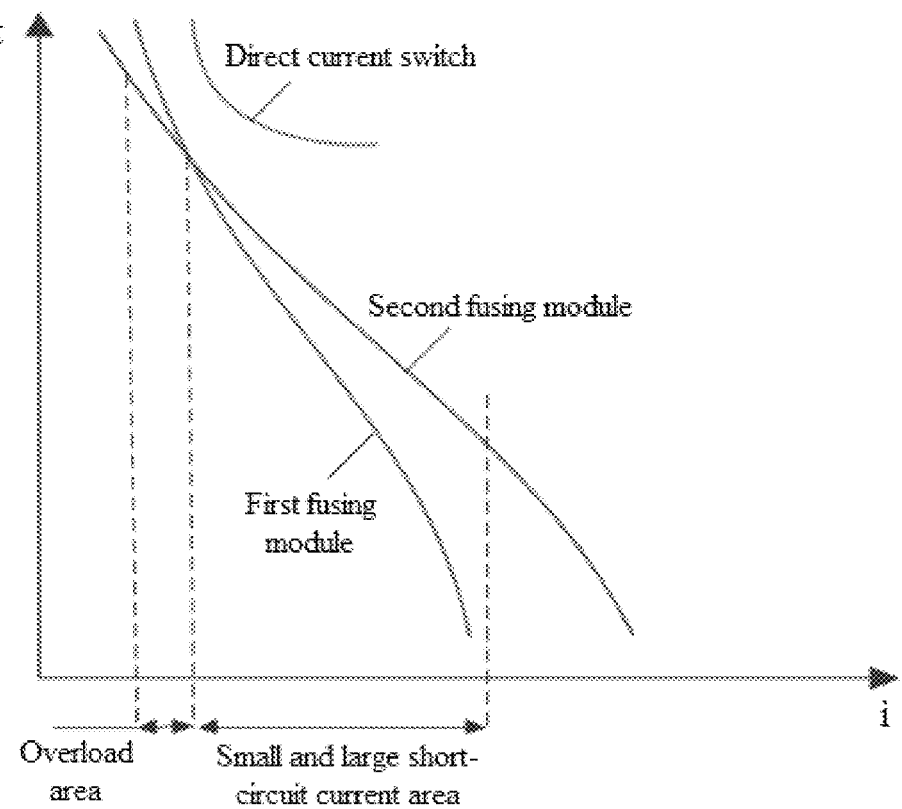
FIG. 7 and FIG. 8 are graphs respectively showing withstand current-time curves of a first fusing module 110, a second fusing module 120 and a direct current switch.
Figure 8:
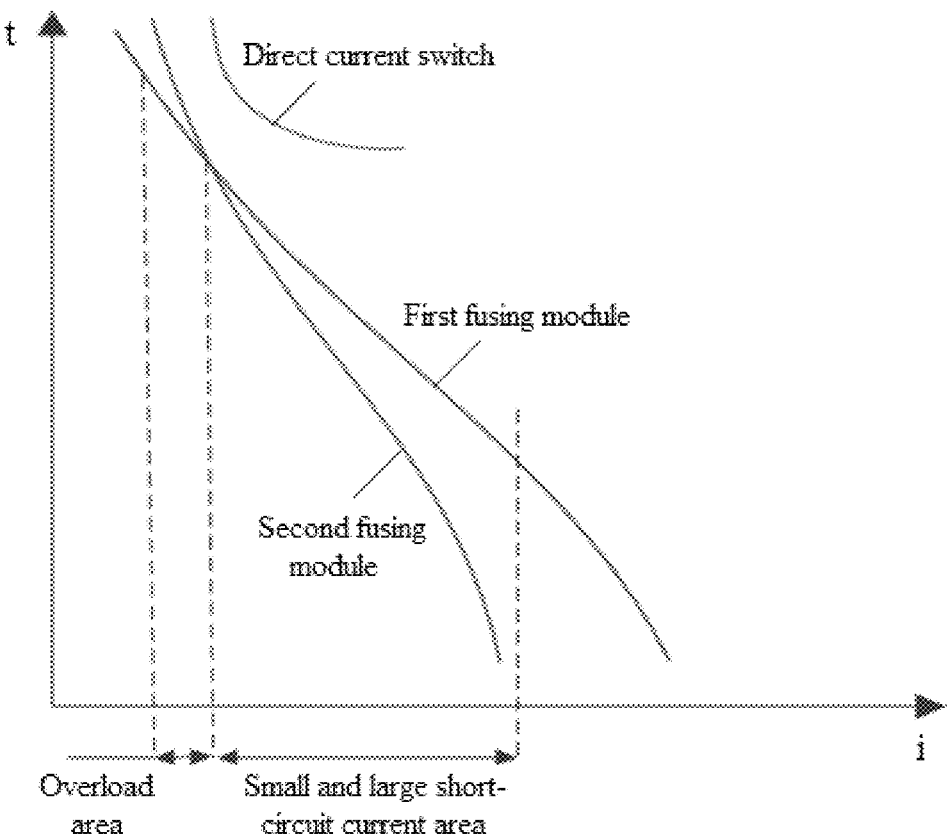

Moreover, in an actual application, a withstand current-time curve of the first fusing module 110 has an intersection point with a withstand current-time curve of the second fusing module 120, as shown in FIG. 7 or FIG. 8.

In a case that the first fusing module 110 is the fuse operating high-sensitively, and the second fusing module 120 is the fuse with an overload breaking capacity and a short-circuit breaking capacity, the withstand current-time curve of the first fusing module 110 and the withstand current-time curve of the second fusing module 120 are as shown in FIG. 7. In a case that the short-circuit fault occurs in the high voltage battery cluster, the first fusing module 110 is fused to cause an open circuit in the high voltage battery cluster prior to the second fusing module 120, and in a case that the overload fault occurs in the high voltage battery cluster, the second fusing module 120 is fused to cause an open circuit in the high voltage battery cluster prior to the first fusing module 110.

In a case that the first fusing module 110 is the fuse with an overload breaking capacity and a short-circuit breaking capacity and the second fusing module 120 is the fuse operating high-sensitively, the withstand current-time curve of the first fusing module 110 and the withstand current-time curve of the second fusing module 120 are as shown in FIG. 8. In a case that the short-circuit fault occurs in the high voltage battery cluster, the second fusing module 120 is fused to cause an open circuit in the high voltage battery cluster prior to the first fusing module 110, and in a case that the overload fault occurs in the high voltage battery cluster, the first fusing module 110 is fused to cause an open circuit in the high voltage battery cluster prior to the second fusing module 120.

In addition, fusing curves of the first fusing module 110 and the second fusing module 120 should be below the withstand current-time curve of the direct current switch. That is, under the same withstanding current, both fusing duration of the first fusing module 110 and fusing duration of the second fusing module 120 are less than fusing duration of the direct current switch in the switch box 150 of the high voltage battery cluster, as shown in FIG. 7 or FIG. 8. Before the direct current switch is broken, the first fusing module 110 or the second fusing module 120 is fused to disconnect the high voltage battery cluster from the circuit prior to the direct current switch, thereby ensuring an operation security of the direct current switch in the switch box 150 of the high voltage battery cluster.

In another embodiment of the present disclosure, the following four arrangements of the first fusing module 110 and the second fusing module 120 are provided.

A first arrangement is as shown in FIG. 1, where the first fusing module 110 is arranged between a direct current switch S1 in a positive branch 130 and an output terminal of the positive branch 130, and the second fusing module 120 is arranged between a direct current switch S2 in a negative branch 140 and an output terminal of the negative branch 140.

Figure 9A:
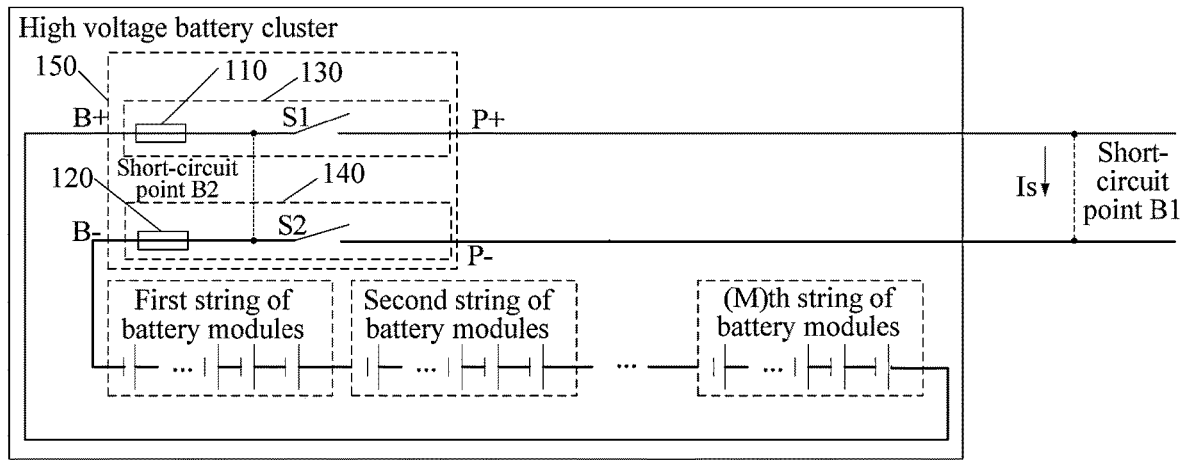
FIG. 9a, FIG. 9b and FIG. 9c are schematic diagrams of three high voltage battery clusters according to another embodiment of the present disclosure.

A second arrangement is as shown in FIG. 9a, where the first fusing module 110 is arranged between the direct current switch S1 in the positive branch 130 and the input terminal of the positive branch, and the second fusing module 120 is arranged between the direct current switch S2 in the negative branch 140 and the input terminal of the negative branch 140.

Figure 9B:
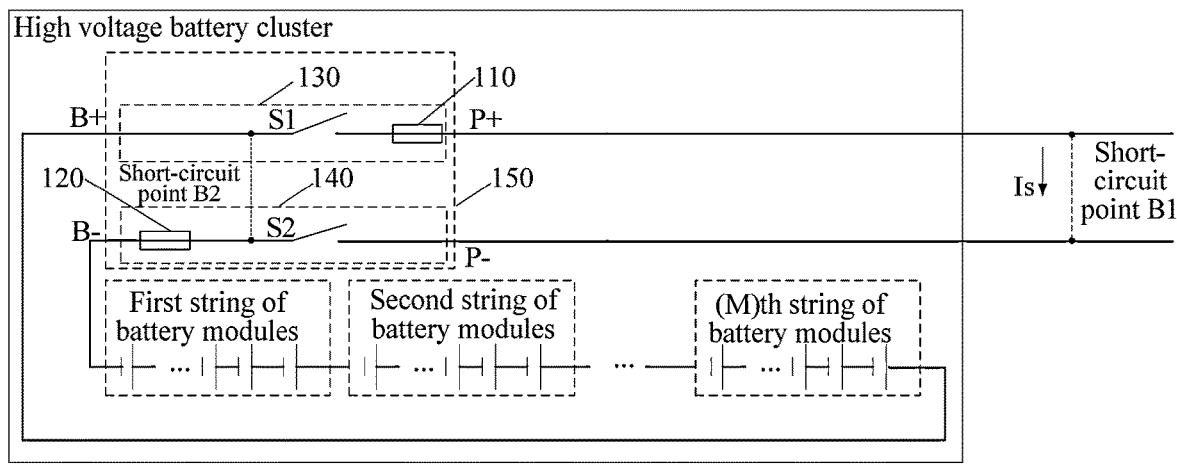

A third arrangement is as shown in FIG. 9b, where the first fusing module 110 is arranged between the direct current switch S1 in the positive branch 130 and an output terminal of the positive branch 130, and the second fusing module 120 is arranged between the direct current switch S2 in the negative branch 140 and the input terminal of the negative branch 140.

Figure 9C:
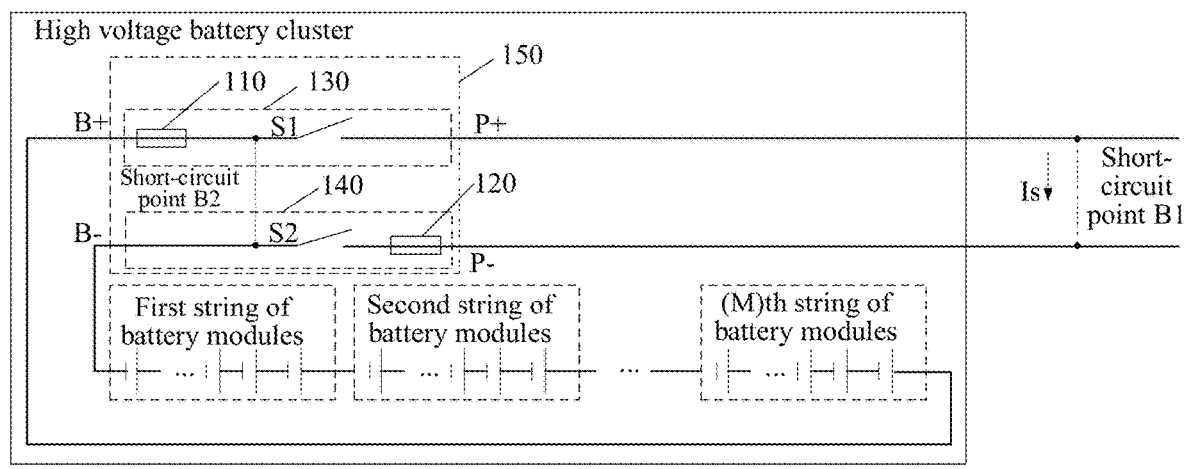

A fourth arrangement is as shown in FIG. 9c, where the first fusing module 110 is arranged between the direct current switch S1 in the positive branch 130 and the input terminal of the positive branch 130, and the second fusing module 120 is arranged between the direct current switch S2 in the negative branch 140 and the output terminal of the negative branch 140.

It is to be noted that one of the four arrangements may selected as needed, which is not limited herein.

It is to be noted that, in a case that a short-circuit fault occurs outside the high voltage battery cluster, that is, in a case that a short-circuit fault occurs at a short-circuit point B1, anyone of the four arrangements of the first fuse 110 and the second fuse 120 in the embodiment can be used to ensure electrical safety of the high voltage battery cluster, such that the high voltage battery cluster can be avoided from being broken due to a large short-circuit current $I_s$ as well as a large current impulse and a large voltage impulse caused during the time period in which the fuses are fused. In addition, in a case that a short-circuit fault occurs in the high voltage battery cluster, that is, in a case that a short-circuit fault occurs at a short-circuit point B2, anyone of the second arrangement, the three arrangement and the fourth arrangement can be used to ensure electrical safety of the high voltage battery cluster, such that the high voltage battery cluster can be avoided from being broken due to a large short-circuit current $I_s$ as well as the large current impulse and the larger voltage impulse caused during the time period in which the fuses are fused. In addition, anyone of the four arrangements of the first fuse 110 and the second fuse 120 in the embodiment can be used to ensure electrical safety of the high voltage battery cluster in a case that the short-circuit fault occurs in the high voltage battery cluster, such that the high voltage battery cluster can be avoided from being broken due to a large short-circuit current $I_s$ as well as a large current impulse and a large voltage impulse caused during the time period in which the fuses are fused.

Other structures and operation principles are the same as that in the above embodiments, which are not described in detail herein.

In another embodiment of the present disclosure, an overcurrent protection circuit of a high voltage battery cluster is provided. Based on any one of above embodiments, the overcurrent protection circuit further includes an RCD snubber circuit 210, as shown in FIG. 10 or FIG. 11 (the switch box 150 is not shown in FIG. 10 and FIG. 11).

Figure 10:
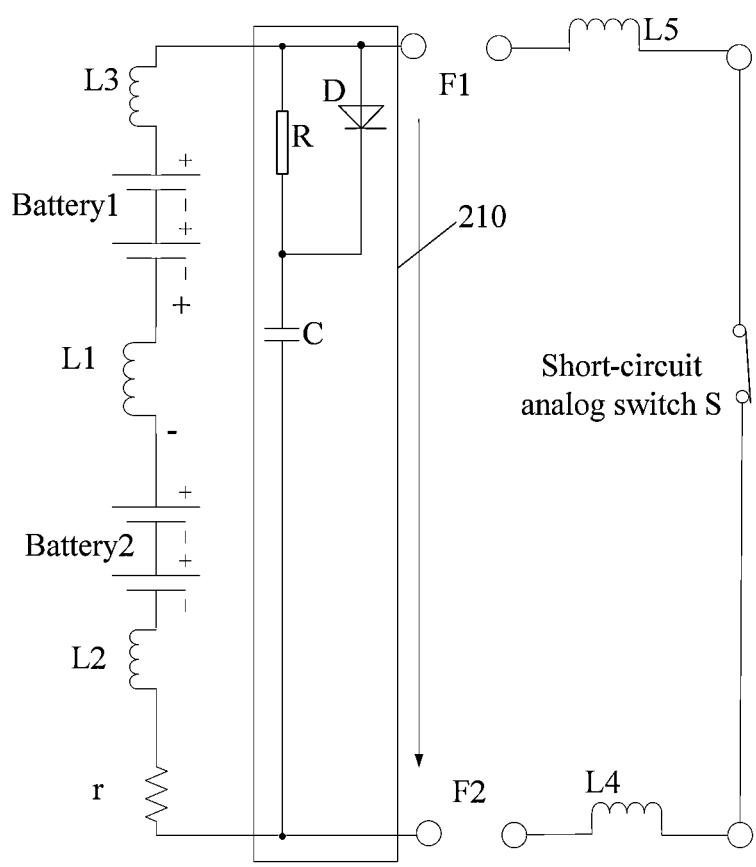
FIG. 10 is a simplified schematic diagram of a circuit of a high voltage battery cluster with an RCD snubber circuit according to another embodiment of the present disclosure.
Figure 11:
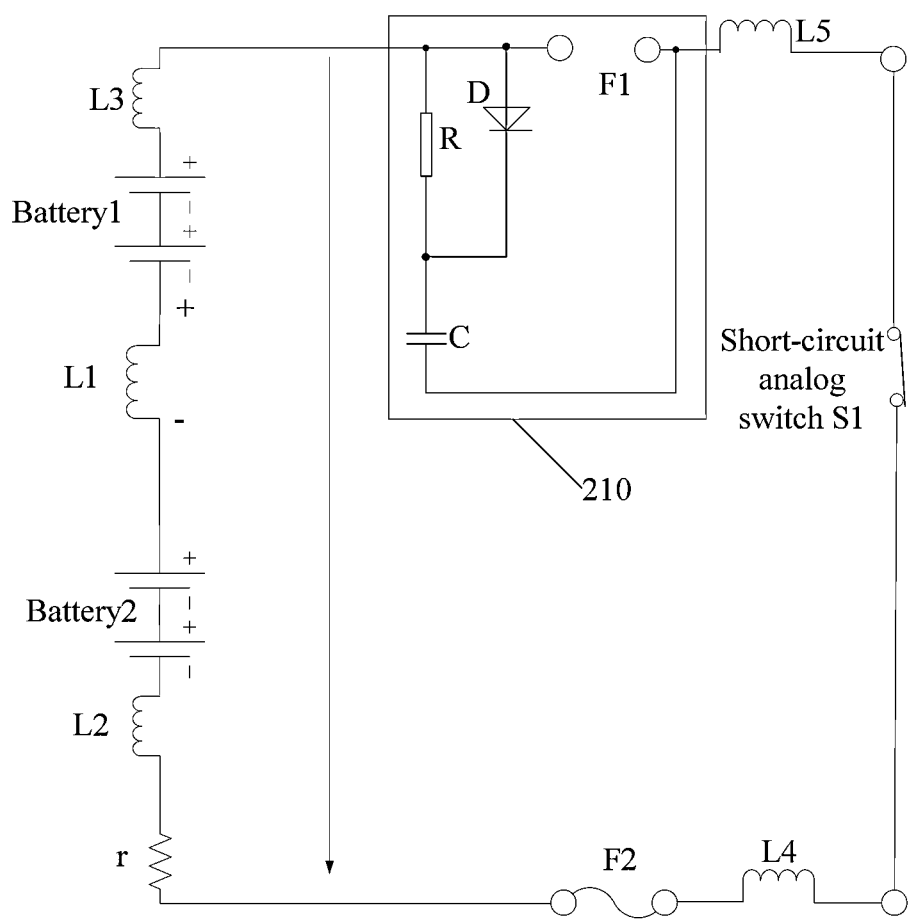
FIG. 11 is a simplified schematic diagram of a circuit of a high voltage battery cluster with an RCD snubber circuit according to another embodiment of the present disclosure.

An input terminal of the RCD snubber circuit 210 is connected to a positive input terminal B+ of the switch box 150 in the high voltage battery cluster, and an output terminal of the RCD snubber circuit 210 is connected to a negative input terminal B− (as shown in FIG. 10) or a positive output terminal P+ (as shown in FIG. 11) of the switch box 150 in the high voltage battery cluster.

It is to be noted that the RCD snubber circuit 210 may further reduce a reverse voltage U generated during the fusing process of the fuse, to reduce a peak value $U_{max}$ of the reverse voltage U, so as to reduce a current impulse and a voltage impulse generated in a circuit.

Specifically, the RCD snubber circuit 210 includes a resistor R, a capacitor C and a diode D. A terminal of the capacitor C serves as an output terminal of the RCD snubber circuit 210, another terminal of the capacitor C is connected to a terminal of the resistor R and a negative electrode of the diode D, and another terminal of the resistor R is connected to a positive electrode of the diode D, where a connection point of the another terminal of the resistor R and the positive electrode of the diode D serves as an input terminal of the RCD snubber circuit 210.

Other structures and operation principles are the same as that in the above embodiments, which are not described in detail herein.

In another embodiment of the present disclosure, a switch box of a high voltage battery cluster is further provided, as shown in FIG. 1, FIG. 9a, FIG. 9b or FIG. 9c. The switch box includes: a positive branch 130, a negative branch 140 and the overcurrent protection circuit of a high voltage battery cluster described in any one of above embodiments.

The positive branch 130 is arranged with a direct current switch S1, and the negative branch 140 is arranged with a direct current switch S2.

An input terminal of the positive branch 130 serves as a positive input terminal B+ of the switch box 150, and an output terminal of the positive branch 130 serves as a positive output terminal P+ of the switch box 150.

An input terminal of the negative branch 140 serves as a negative input terminal B− of the switch box 150, and an output terminal of the negative branch 140 serves as a negative output terminal P− of the switch box 150.

It is to be noted that the RCD snubber circuit 210 in the overcurrent protection circuit of a high voltage battery cluster may be arranged in the switch box 150, facilitating an installation of the high voltage battery cluster. In addition, the RCD snubber circuit 210 may also be arranged outside the switch box 150, facilitating a disassembly of the RCD snubber circuit 210, and it may be determined whether to arrange the RCD snubber circuit 210 as needed. One of two arrangements of the RCD snubber circuit 210 may be selected depending on actual needs, which is not limited herein.

Other structures and operation principles are the same as that in the above embodiments, which are not described in detail herein.

In another embodiment of the present disclosure, a high voltage battery cluster is further provided, as shown in FIG. 1, FIG. 9a, FIG. 9b or FIG. 9c. The high voltage battery cluster includes N battery modules (a first string of battery modules, a second string of battery modules . . . and a (m)th string of battery modules) and the switch box 150 of a high voltage battery cluster described in the above embodiment.

The N battery modules are sequentially connected in series to form a battery module branch. A positive electrode of the battery module branch is connected to the positive input terminal B+ of the switch box 150, and a negative electrode of the battery module branch is connected to the negative input terminal B− of the switch box 150.

The positive output terminal P+ of the switch box 150 serves as a positive electrode of the high voltage battery cluster and is connected to a positive electrode of a circuit. The negative output terminal P− of the switch box 150 serves as a negative electrode of the high voltage battery cluster and is connected to a negative electrode of the circuit.

Other structures and operation principles are the same as that in the above embodiments, which are not described in detail herein.

The embodiments in this specification are described in a progressive way, each of which emphasizes the differences from others, and the same or similar parts among the embodiments can be referred to each other.

With the description of the embodiments disclosed above, those skilled in the art may implement or use technical solutions of the present disclosure. Numerous modifications to the embodiments are apparent to those skilled in the art, and the general principles defined herein may be implemented in other embodiments without departing from the spirit or scope of the present disclosure. Therefore, the present disclosure may not be limited to the embodiments described herein, but should comply with the widest scope consistent with the principles and novel features disclosed herein.

The invention claimed is:

1. An overcurrent protection circuit of a high voltage battery cluster, comprising:
   a first fusing module arranged in a positive branch of a switch box of the high voltage battery cluster; and
   a second fusing module arranged in a negative branch of the switch box of the high voltage battery cluster, wherein
   a withstand current-time curve of the first fusing module is different from a withstand current-time curve of the second fusing module,
   wherein under a same withstanding current, fusing duration of the first fusing module is less than fusing duration of a first direct current switch, and fusing duration of the second fusing module is less than fusing duration of a second direct current switch in the switch box of the high voltage battery cluster.

2. The overcurrent protection circuit according to claim 1, wherein the first fusing module is arranged between a first direct current switch in the positive branch and an output terminal of the positive branch, and the second fusing module is arranged between a second direct current switch in the negative branch and an input terminal of the negative branch; or
   the first fusing module is arranged between the first direct current switch in the positive branch and an input terminal of the positive branch, and the second fusing module is arranged between the second direct current switch in the negative branch and an output terminal of the negative branch.

3. The overcurrent protection circuit according to claim 1, wherein the first fusing module is arranged between a first direct current switch in the positive branch and an output terminal of the positive branch, and the second fusing module is arranged between a second direct current switch in the negative branch and an output terminal of the negative branch; or the first fusing module is arranged between the first direct current switch in the positive branch and an input terminal of the positive branch, and the second fusing module is arranged between the second direct current switch in the negative branch and an input terminal of the negative branch.

4. The overcurrent protection circuit according to claim 1, wherein one of the first fusing module and the second fusing module is a fuse operating high-sensitively.

5. The overcurrent protection circuit according to claim 4, wherein another of the first fusing module and the second fusing module is a fuse with both an overload breaking capacity and a short-circuit breaking capacity.

6. The overcurrent protection circuit according to claim 1, wherein the withstand current-time curve of the first fusing module has an intersection point with the withstand current-time curve of the second fusing module.

7. The overcurrent protection circuit according to claim 1, further comprising:

an RCD snubber circuit, wherein an input terminal of the RCD snubber circuit is connected to a positive input terminal of the switch box, and an output terminal of the RCD snubber circuit is connected to a negative input terminal or a positive output terminal of the switch box.

8. The overcurrent protection circuit according to claim 7, wherein the RCD snubber circuit comprises: a resistor, a capacitor and a diode, wherein a terminal of the resistor is connected to a positive electrode of the diode, and a connection point between the terminal of the resistor and the positive electrode of the diode serves as the input terminal of the RCD snubber circuit, another terminal of the resistor and a negative electrode of the diode are connected to a terminal of the capacitor, and another terminal of the capacitor serves as the output terminal of the RCD snubber circuit.

9. A switch box of a high voltage battery cluster, comprising: a positive branch, a negative branch and an overcurrent protection circuit, wherein the overcurrent protection circuit comprises:
a first fusing module arranged in the positive branch of the switch box of the high voltage battery cluster; and
a second fusing module arranged in the negative branch of the switch box of the high voltage battery cluster, wherein a withstand current-time curve of the first fusing module is different from a withstand current-time curve of the second fusing module, the positive branch is arranged with a first direct current switch, and the negative branch is arranged with a second direct current switch, an input terminal of the positive branch serves as a positive input terminal of the switch box, and an output terminal of the positive branch serves as a positive output terminal of the switch box, and an input terminal of the negative branch serves as a negative input terminal of the switch box, and an output terminal of the negative branch serves as a negative output terminal of the switch box, wherein under a same withstanding current, fusing duration of the first fusing module is less than fusing duration of the first direct current switch, and fusing duration of the second fusing module is less than fusing duration of the second direct current switch in the switch box of the high voltage battery cluster.

10. The switch box according to claim 9, wherein the first fusing module is arranged between the first direct current switch in the positive branch and an output terminal of the positive branch, and the second fusing module is arranged between the second direct current switch in the negative branch and an input terminal of the negative branch; or the first fusing module is arranged between the first direct current switch in the positive branch and an input terminal of the positive branch, and the second fusing module is arranged between the second direct current switch in the negative branch and an output terminal of the negative branch.

11. The switch box according to claim 9, wherein the first fusing module is arranged between the first direct current switch in the positive branch and an output terminal of the positive branch, and the second fusing module is arranged between the second direct current switch in the negative branch and an output terminal of the negative branch; or the first fusing module is arranged between the first direct current switch in the positive branch and an input terminal of the positive branch, and the second fusing module is arranged between the second direct current switch in the negative branch and an input terminal of the negative branch.

12. The switch box according to claim 9, wherein one of the first fusing module and the second fusing module is a fuse operating high-sensitively.

13. The switch box according to claim 12, wherein another of the first fusing module and the second fusing module is a fuse with both an overload breaking capacity and a short-circuit breaking capacity.

14. The switch box according to claim 9, wherein the withstand current-time curve of the first fusing module has an intersection point with the withstand current-time curve of the second fusing module.

15. The switch box according to claim 9, further comprising:

an RCD snubber circuit, wherein an input terminal of the RCD snubber circuit is connected to a positive input terminal of the switch box, and an output terminal of the RCD snubber circuit is connected to a negative input terminal or a positive output terminal of the switch box.

16. The switch box according to claim 15, wherein the RCD snubber circuit comprises: a resistor, a capacitor and a diode, wherein a terminal of the resistor is connected to a positive electrode of the diode, and a connection point between the terminal of the resistor and the positive electrode of the diode serves as the input terminal of the RCD snubber circuit, another terminal of the resistor and a negative electrode of the diode are connected to a terminal of the capacitor, and another terminal of the capacitor serves as the output terminal of the RCD snubber circuit.

17. A high voltage battery cluster, comprising: N battery modules, and a switch box, wherein the switch box comprises: a positive branch, a negative branch and an overcurrent protection circuit, and wherein the overcurrent protection circuit comprises:
a first fusing module arranged in the positive branch of the switch box of the high voltage battery cluster; and
a second fusing module arranged in the negative branch of the switch box of the high voltage battery cluster, wherein
a withstand current-time curve of the first fusing module is different from a withstand current-time curve of the second fusing module,
the positive branch is arranged with a first direct current switch and the negative branch is arranged with a second direct current switch,
an input terminal of the positive branch serves as a positive input terminal of the switch box, and an output terminal of the positive branch serves as a positive output terminal of the switch box, and
an input terminal of the negative branch serves as a negative input terminal of the switch box, and an output terminal of the negative branch serves as a negative output terminal of the switch box, the N battery modules are sequentially connected in series to form a series branch, wherein a positive electrode of the series branch is connected to the positive input terminal of the switch box, and a negative electrode of the series branch is connected to the negative input terminal of the switch box, the positive output terminal of the switch box serves as a positive electrode of the high voltage battery cluster, and the negative output terminal of the switch box serves as a negative electrode of the high voltage battery cluster, wherein under a same withstanding current, fusing duration of the first fusing module is less than fusing duration of the first direct current switch, and fusing duration of the second fusing module is less than fusing duration of the second direct current switch in the switch box of the high voltage battery cluster.

* * * * *